US008596628B2

(12) United States Patent
Huber et al.

(10) Patent No.: US 8,596,628 B2
(45) Date of Patent: Dec. 3, 2013

(54) APPARATUS FOR HOLDING A MEASUREMENT OBJECT IN A REFERENCE POSITION

(75) Inventors: Alfred Huber, Eppelborn (DE); Franz-Rudolf Junker, Tholey-Sotzweiler (DE)

(73) Assignee: Junker & Partner GmbH, Tholey (DE)

( * ) Notice: Subject to any disclaimer, the term of this patent is extended or adjusted under 35 U.S.C. 154(b) by 370 days.

(21) Appl. No.: 12/803,218

(22) Filed: Jun. 22, 2010

(65) Prior Publication Data

US 2011/0309560 A1 Dec. 22, 2011

(51) Int. Cl.

| | |
|---|---|
| ***B25B 1/00*** | (2006.01) |
| ***B23Q 1/25*** | (2006.01) |
| ***B23Q 3/18*** | (2006.01) |

(52) U.S. Cl.

USPC .................... 269/86; 269/55; 269/59; 269/60; 269/69

(58) Field of Classification Search

USPC ...... 269/86, 55, 59, 60, 289 R, 302.1, 43, 66, 269/21, 71, 32, 20, 24–27, 45, 309, 9, 69; 33/573; 29/464, 468

See application file for complete search history.

(56) References Cited

U.S. PATENT DOCUMENTS

| | | | | |
|---|---|---|---|---|
| 5,305,510 | A * | 4/1994 | Croft et al. | 29/237 |
| 5,305,992 | A * | 4/1994 | Kish | 269/51 |
| 6,430,792 | B1 * | 8/2002 | Foster et al. | 29/237 |
| 7,114,715 | B1 * | 10/2006 | Kirk | 269/147 |
| 7,159,496 | B2 * | 1/2007 | Maes | 83/452 |
| 2008/0106020 | A1 * | 5/2008 | Sherlock | 269/71 |

* cited by examiner

*Primary Examiner* — Monica Carter
*Assistant Examiner* — Nirvana Deonauth
(74) *Attorney, Agent, or Firm* — Jordan and Hamburg LLP

(57) ABSTRACT

An apparatus for holding a measurement object, particularly an auto body component in a reference position, comprises a clamping device, which can be attached to a carrier head, and which extends over the measurement object and holds it against the carrier head, and comprises a clamping element that can be placed against the measurement object. The clamping device comprises a lockable slide for adjusting the position of the clamping element.

9 Claims, 1 Drawing Sheet

APPARATUS FOR HOLDING A MEASUREMENT OBJECT IN A REFERENCE POSITION

BACKGROUND OF THE INVENTION

The invention relates to an apparatus for holding a measurement object, and particularly an auto body component to be measured, in a reference position, comprising a clamping device, which can be attached to a carrier head, extends over the measurement object and holds it against the carrier head, and comprises a clamping element that can be placed against the measurement object.

Apparatuses having clamping devices of this sort are known from implementations wherein clamping elements that can be placed against the measurement object are connected to a lever, which can be pivoted between the carrier head and the clamping element against a spring force for the purpose of clamping the measurement object.

SUMMARY OF THE INVENTION

An object of the invention is to provide a novel apparatus of the type described above, which enables a more precise arrangement of the measurement object in the reference position, with reduced clamping complexity.

The apparatus according to the invention by which this object is achieved is characterized in that the clamping apparatus comprises a lockable slide for adjusting the position of the clamping element.

Advantageously, the lockable slide allows for linear adjustment of the position of the clamping element, which can be oriented with respect to the carrier head so that there is no transverse component that displaces the measurement object and lowers the accuracy of the clamping position.

In a preferred embodiment of the invention, the slide can be moved parallel to a carrier head advancement axis.

In a further embodiment of the invention, the clamping device can be pivoted against the carrier head, and preferably around this advancement axis. In this manner, the clamping device can be disposed at a clamping site in various manners, so as to adapt to different measurement objects.

In a preferred embodiment, the clamping device embraces the carrier head with a forked part, the fork part preferably being guided in a groove extending peripherally on the carrier head, and preferably around the advancement axis.

The fork part may be integrally formed with a carrier body that forms a slide guide.

The slide preferably comprises a stud having a circular cross-section. The slide guide can thus be easily produced by way of boring.

Advantageously, a screw which is coaxial with respect to the stud, is provided for generating a clamping force.

In the preferred embodiment of the invention, the stud also has a longitudinal groove for engaging a locking pin, which secures the stud so as to prevent rotation.

In a further embodiment of the invention, a locking screw is provided on at least one fork leg of the fork part, the locking screw having a screw axis that is offset with respect to the center line of the carrier head in the direction of the free leg end that is an outermost end of the at least one fork leg of the fork part substantially adjacent the locking screw.

The invention will be described in more detail hereinafter based on an exemplary embodiment and the accompanying drawings referencing this exemplary embodiment.

DESCRIPTION OF THE PREFERRED EMBODIMENTS

Figure 1:
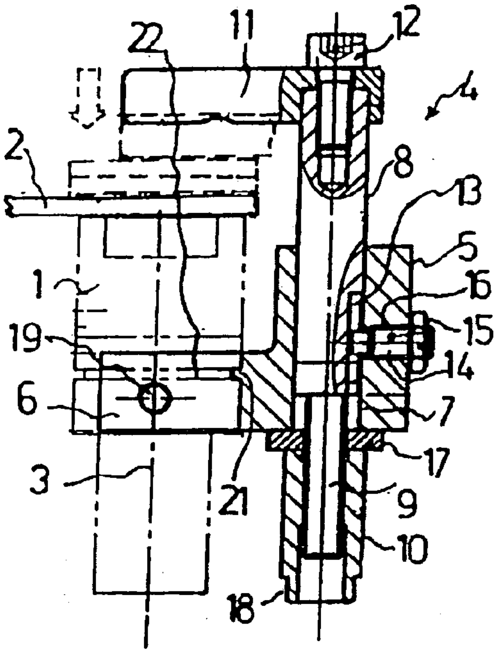
FIG. 1 is a partially cutaway side view of a clamping device according to the invention, which is attached to a carrier head.
Figure 2:
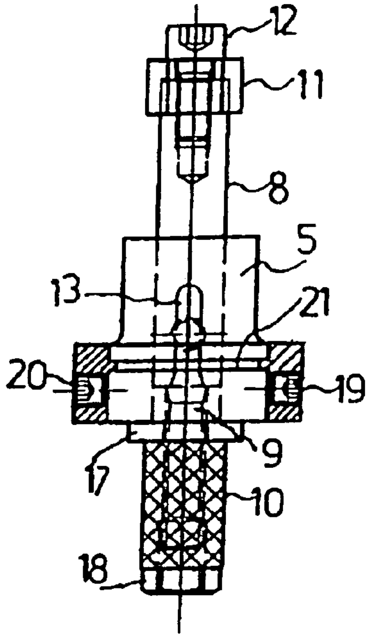
FIG. 2 is a side view of the clamping device of FIG. 1 rotated 90° with respect to the side view of FIG. 1.

A carrier head 1 for receiving an auto body component 2 to be measured can be moved by a holding and moving device, which is not shown, along an advancement axis 3 into a desired support position. A clamping device 4 is attached to the carrier head 1, which is rotation-symmetrical in the embodiment shown.

The clamping device 4 comprises a holding body 5, which is made of a brass and bronze alloy, having a fork part 6, which embraces the carrier 1 over a portion of the circumference thereof. The holding body 5 further comprises a guide bore 7 for a sliding stud 8, having a circular cross-section. The sliding stud 8 can be displaced parallel to the advancement axis 3 in the guide bore 7.

At one end, the sliding stud 8 is connected to a threaded bolt 9 protruding from the guide bore 7, a knurled nut 10 that is coaxial with respect to the sliding stud 8 being screwed onto the threaded bolt. At the other end, a laterally protruding clamping plate 11 is attached to the sliding stud 8.

A screw 12, which is coaxially screwed into the sliding stud 8, is used to connect the clamping plate 11 made of hardened material to the sliding stud 8. In addition to the screw connection, the clamping plate 11 and the sliding stud 8 are connected by an adhesive bond.

A non-threaded end of a threaded pin 14 engages in a longitudinal groove 13 provided in the sliding stud 8, and is locked in a threaded bore 16 in the holding part 5 by way of a nut 15.

A washer 17 protecting the holding part is disposed between the knurled nut 10 and the holding part 5. The knurled nut 10 has a head part 18 with contact surfaces for a lathe tool at the end facing away from the washer.

Figure 3:
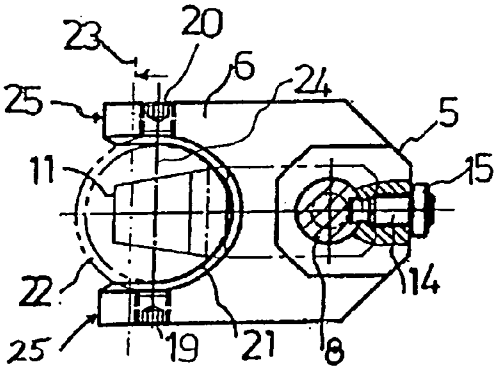
FIG. 3 is a bottom view of the clamping devices of FIGS. 1 and 2.

A bore for a grub screw 19 or 20, for locking the leg to the carrier head 1, is provided on each of the two legs of the fork part 6 of the holding body 5. As shown in FIG. 3, the screw axes 23 of the grub screws can be offset relative to the a center line 24 of the carrier head 1, in the direction of the free end 25 of each of the legs of the fork part 6 that defines an outermost end of the fork part 6 substantially adjacent a grub screw 19 or 20, so that the holding body 5 can be connected by the grub screws 19, 20 to the carrier head 1, not only by non-positive engagement, but also by positive engagement. A protrusion 21, which engages in an annular groove 22 extending around the periphery of the carrier head 1, runs on the inside of the legs of the fork part 6.

The clamping plate 11 is moved close to the auto body part 2 by displacing the sliding stud 8, and the clamping pate 11 is pulled close to the auto body component 2 by tightening the knurled nut 10, whereby the auto body part 2 held against the carrier head 1 can be clamped to the carrier head 1.

If the component at the clamping site changes, for example if additional sheet metal layers are added, as shown in FIG. 1 by dotted lines, the clamping connection can easily be adjusted.

The invention claimed is:

1. An apparatus for holding a measurement object, in a reference position, comprising:

a clamping device which can be attached to a carrier head and which extends over the measurement object and holds the measuring object against the carrier head, and a clamping element that is placed against the measurement object, the clamping device comprising a lockable slide for adjusting the position of the clamping element, the lockable slide comprising a stud having a circular cross-section and a longitudinal groove for engaging a locking pin so as to secure the stud and prevent rotation.

2. The apparatus according to claim 1, wherein the carrier head is moveable along an advancement axis and the slide can be moved parallel to an advancement axis of the carrier head.

3. The apparatus according to claim 1, wherein the clamping device can be pivoted against the carrier head.

4. An apparatus according to claim 1, wherein the clamping device partially embraces the carrier head with a fork part.

5. The apparatus according to claim 4, wherein the fork part is guided in a peripheral groove around the carrier head.

6. An apparatus according to claim 4, wherein the fork part is integrally formed with a carrier body forming a slide guide.

7. An apparatus according to claim 4, wherein a locking screw is provided on at least one fork part, the locking pin having a screw axis that lies beyond a center line of the carrier head in a direction of a free end of the at least one leg of the fork part, said free end defining an outermost end of the at least one leg of the fork part substantially adjacent the locking screw.

8. The apparatus according to claim 1, wherein a screw which is coaxial with respect to the stud of the lockable slide is provided for generating a clamping force.

9. The apparatus according to claim 1, wherein the clamping device can be pivoted against the carrier head around the advancement axis.

* * * * *